UNITED STATES PATENT OFFICE.

JOHN PORTER, OF NEW CUMBERLAND, WEST VIRGINIA.

PAVING-BLOCK.

SPECIFICATION forming part of Letters Patent No. 302,279, dated July 22, 1884.

Application filed May 24, 1884. (No specimens.)

*To all whom it may concern:*

Be it known that I, JOHN PORTER, of New Cumberland, in the county of Hancock and State of West Virginia, have invented a new and useful Improvement in Paving-Blocks; and I do hereby declare the following to be a full, clear and exact description thereof.

My invention relates to an improvement in paving-blocks; and it consists in a paving-block formed of clay and a metallic ore, as hereinafter more fully appears.

I will now describe my invention so that others skilled in the art may manufacture and use the same.

I prefer to form the blocks, which may be of any form and size desired, of pulverized iron ore and fire-clay, as follows: After or before the clay has been tempered, as in the usual mode of manufacturing fire-brick, I add thereto a small quantity of pulverized iron ore, mill-cinder, or furnace-slag, and a sufficient quantity of common salt, (chloride of sodium,) or other fluxing material. These are thoroughly mixed or ground with the clay, which is then molded into bricks or blocks, and burned in the usual manner, sufficient heat being applied to reduce the ore or other metallic substance which is mingled with the clay. By the action of the heat the brick is burned and the metallic substance is reduced to a spongy state, which on cooling imparts great hardness and tenacity to the block.

Although I have mentioned fire-brick clay, iron ore, cinder, and slag, I do not desire to limit myself to any particular kind of clay, metallic ore, or substance.

I am aware that furnace-slag has been employed for paving, and I therefore do not desire to claim the same, broadly; but,

Having thus described my invention, what I claim, and desire to secure by Letters Patent, is—

1. A paving block or brick composed of clay and iron ore, or its described equivalent, united by the action of heat, substantially as and for the purpose specified.

2. A paving block or brick composed of clay and iron ore, or its described equivalent, vitrified by the action of heat and the presence of a flux, substantially as and for the purpose specified.

3. A paving block or brick composed of fire-brick clay and iron ore united by the action of heat in the presence of a flux, substantially as and for the purpose specified.

In testimony whereof I have hereunto set my hand this 21st day of May, A. D. 1884.

JOHN PORTER.

Witnesses:
 JOS. H. JACOBS,
 THOMAS W. BAKEWELL.